United States Patent Office 3,515,789
Patented June 2, 1970

3,515,789
ANALGESIC-HYPNOTIC THERAPY WITH 4-IMIDAZOLEACETIC ACID
Eugene Roberts, Pasadena, Calif., assignor to City of Hope, a National Medical Center, Duarte, Calif., a corporation of California
Continuation-in-part of application Ser. No. 553,186, May 26, 1966. This application July 17, 1967, Ser. No. 660,548
Int. Cl. A61k 27/00
U.S. Cl. 424—273
7 Claims

ABSTRACT OF THE DISCLOSURE

In accordance with the invention, analgesia and sleep, as well as the sedation and tranquilization associated therewith, are brought about in animals by administering, by any selected route such as oral or parenteral, a therapeutically effective dose of imidazoleacetic acid, which may be in the free acid form, or in the form of a salt thereof, such as sodium, potassium, sulfate, acetate, and the like, or in the form of a lower alkyl ester thereof, such as ethyl, propyl, and the like.

---

This application is a continuation-in-part of my copending application, Ser. No. 553,186, filed May 26, 1966 now abandoned, and entitled "Analgesic-Hypnotic Therapy."

This invention relates to a novel method of treating animals to bring about analgesia and sleep.

A wide variety of therapeutic agents are known which have the property of inducing analgesia at lower concentrations and sleep at higher concentrations when administered to warm-blooded animals. Most of the known and used substances suffer from one or more disadvantages, among which may be mentioned habituation, tendency toward addiction, and side effects such as allergenic manifestations, inducing of blood dyscrasias, and the like. It is apparent that in spit of the large amount of effort that has been expended in the past on the development of agents of this type, much room for improvement still remains.

Figure 1:
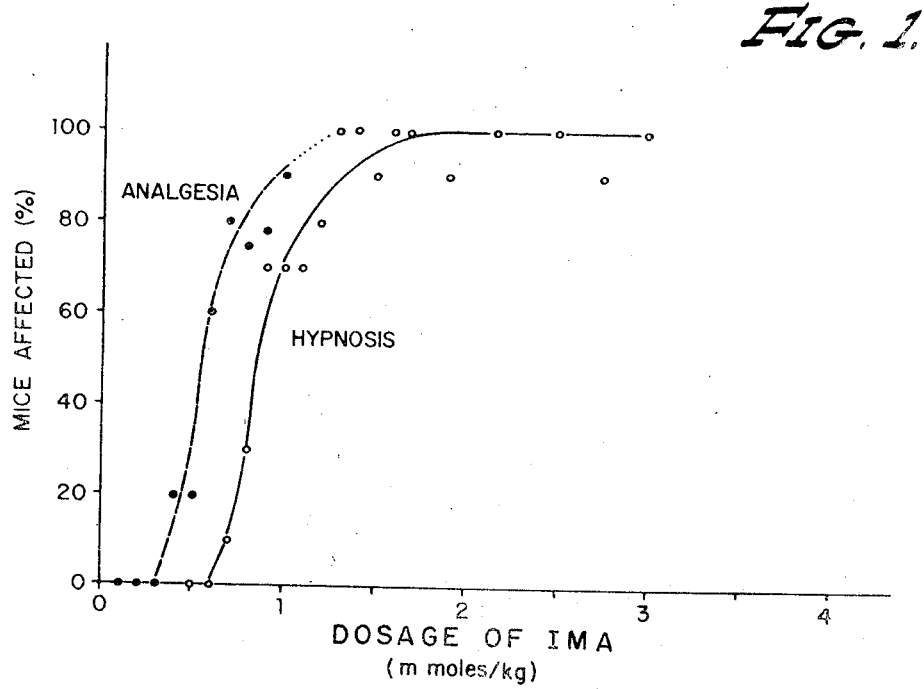
Figure 2:
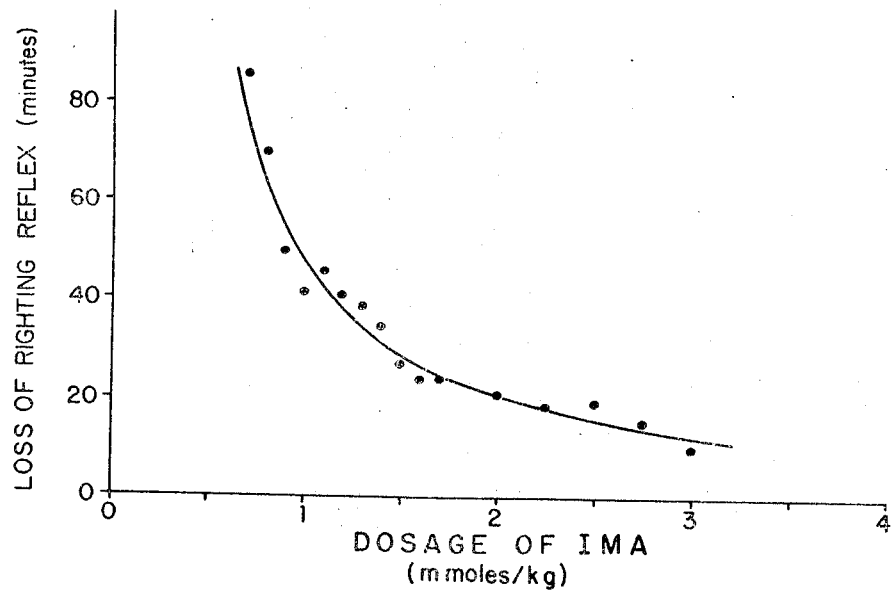

In the drawing, FIGS. 1 and 2 show various responses in accordance with the invention.

I have discovered that both analgesia and sleep can be induced in warm-blooded animals by administering them relatively small amounts of imidazoleacetic acid or salts of imidazoleacetic acid whereof the counter-ion is a pharmaceutically acceptable substance, or lower alkyl esters of imidazoleacetic acid, as explained in detail hereinbelow. In general, the imidazoleacetic acid or the selected salt or ester thereof, as described, may be injected or administered orally. In the case of small test animals such as mice, intraperitoneal injection is suitable and in the case of larger animals, such as rats, guinea pigs, and even larger animals, the administrative route may be oral as well as by parenteral injection.

In general, from 0.1 to 1.0 millimols per kilogram weight of animal gives analgesia and from about 1 to 5 millimols per kilogram produces sleep, these dosage ranges being for injection, with approximately twice as much required when the substance is administered orally.

When injection is the chosen route, the imidazoleacetic acid or salt or ester thereof may be in solution, preferably aqueous, and preferably in physiologic saline; and when administered orally, depending on the animal concerned, it may likewise be in solution form or in tablet or capsule or like form as a dry substance, and mixed if desired with the usual excipients.

Imidazoleacetic acid has a carboxyl group which forms salts and esters much after the manner of acetic acid itself with, respectively, such bases as sodium hydroxide, potassium hydroxide, lithium hydroxide, and the like, and with lower alkyl alcohols, wherein by lower alkyl is to be understood methyl, ethyl, propyl, butyl. It also has a basic nitrogen atom in the imidazole ring which forms acid salts in the usual fashion, for example, with hydrochloric acid, sulfuric acid, acetic acid, and the like. Imidazoleacetic acid is commercially available as the hydrochloride salt, and I may use this without further treatment, except where the acidity thereof will be disadvantageous. It may be conveniently dissolved in water, or indeed in physiologic saline solution, and then neutralized with sodium hydroxide.

As an example of the effectiveness of the invention on mice, a number of male mice were injected intraperitoneally with 0.1 millimol/kilogram of a solution of imidazoleacetic acid hydrochloric brought to neutrality with sodium hydroxide, of such concentrations as to give dosage levels as shown in the drawings, viz., from 0.1 through 3.0 millimols/kilogram of animal weight.

The analgesic effectiveness of imidazoleacetic acid (IMA) was measured in the mice by a modification of a commonly used "hot plate" method. A thermostatically controlled hot plate was set as 55° C. A bottomless restraining cylinder, 5 inches in height, was made from a tin can. Mice were placed on the hot plate in the cylinder and were observed. The reaction time was measured with a stop watch from the moment the feet of the mouse touched the hot plate. The endpoint employed was either the licking of the front feet or the climbing or jumping out of the cylinder. All other behavioral signs were disregarded. If the response time required was less than thirty seconds, the result was called negative; if it was thirty seconds or greater, it was considered positive. The animals were not allowed to remain on the hot plate longer than 35 seconds. Ten cages of mice were used, each containing eight to ten fasted male mice averaging 25 grams in body weight. The reaction times of the mice in each cage were measured and then the animals were injected with 0.1 ml. of neutral solution containing the selected dosage of IMA. The control reaction times averaged 10 seconds, the range of values being between 1 and 15 seconds. The reaction times were then re-measured at 30 and 130 minutes after the injection. In those instances in which positive results were obtained, the results at the period giving the maximal number of positive responses were employed for the points shown in FIG. 1. No analgesic effects were noted by the above procedure at the 0.1 to 0.3 mmol/kg. level, while 90 percent of the mice receiving 1.0 mmol/kg. gave a positive result.

When IMA was tested at the higher dose levels, it was noted that there always was a period during which there was impairment in the righting reflex prior to sleep. It was possible to detect this effect either by direct observation of the animals or by turning them over and noting whether or not they returned to a normal position. It was decided to employ the loss of the righting reflex as an indicator of the onset of the hypnotic effect of IMA. Eighteen groups of ten mice were tested at dose levels of IMA ranging from 0.5 to 3.0 mmols/kg. The percentages of the animals in which a hynotic effect was produced at the various doses are shown in FIG. 1. It is interesting that a dose of IMA (0.6 mmol/kg.), which was 60 percent effective in the analgesic test, was below the level producing a hypnotic effect. The results in FIG. 2 show that a relationship exists between the average time after injection of IMA required for loss of the righting reflex and the dose of IMA employed. No such relationship was found between the dose of IMA and the total sleeping time. All of the mice which fell asleep in this series of experiments slept for at least two hours.

A number of rats were injected at a dosage level of 4 mmol/kg. and results comparable to those found in the mice were obtained.

Oral administration of IMA to rats at a dosage level of 4 mmol/kg. produced detectable effects, although of a lesser degree than those obtained with the rats at the same dosage level by injection.

A number of experiments were carried out the various compounds closely related in structure to IMA. Negative results were obtained in mice with imidazolepropionic acid (dihydrourocanic acid) in experiments with four groups of five mice, each injected with 1, 2, 3, or 4 mmol/kg. Experiments in 40 mice with histidine at 4 mmol/kg. also were negative. The following substances tested at 3 mmol/kg. tested in the indicated number of mice also did not produce any of the effects noted with IMA at this level: imidazole, 10; 4-hydroxymethylimidazole, 10; 1-methylimidazole-4-acetic acid, 7; imidazolepyruvic acid, 10; imidazoleacrylic acid, 10. Negative results were also obtained in groups of ten mice with 4-acetylimidazole, with imidazole mono-4-carboxylic acid, and with imidazole-4,5-dicarboxylic acid. (In all cases, unless otherwise noted, the substitutions in the imidazole ring are in the "4" position, including particularly the compound used in the invention, viz., 4-imidazoleacetic acid.) Considering these results, therefore, it appears that considerable structural specificity must be associated with the biological effects of imidazoleacetic acid in mice.

As already mentioned, the therapeutic effects of imidazoleacetic acid are likewise obtained when it is used in the form of a lower alkyl ester thereof, viz., the methyl, ethyl, propyl, or butyl ester. (Propyl, of course, includes both normal and isopropyl, and in the same fashion, butyl includes normal, iso-, and ter-butyl.) As examples, some results are given below of simplified tests in which mice (of the same strain as described previously) were injected with imidazoleacetic acid, and with the indicated esters thereof. Drowsiness and/or sleep was observed and recorded. Results follow:

(A) Imidazoleacetic
  5 mice—3 mmol/kg. body weight I.P. injections.
  20–25 minutes required before sleep attained.
  All 5 mice slept an average of 4 hours.
  No fatalities.
(B) Methyl ester
  5 mice—3 mmol/kg. body weight.
  6–25 minutes required before sleep attained.
  2 mice slept 4½ hours.
  3 mice slept more than 6 hours (were asleep at 5 p.m.).
  No fatalities.
(C) Ethyl ester
  5 mice—3 mmol/kg. body weight.
  One unaffected.
  4 fell asleep in 20 to 25 minutes after injection.
  2 slept 3½ hours.
  1 slept 4½ hours.
  1 slept 5¼ hours.
  All were normal thereafter.
  No fatalities.
(D–1) Isopropyl ester
  5 mice—1.5 mmol/kg. body weight.
  3 mice required 40–45 minutes to attain sleep.
  These same 3 mice slept 1.0–1.5–3.0 hours respectively.
  2 mice did not sleep at all but were drowsy.
  No fatalities.
(D–2) Isopropyl ester
  5 mice—0.75 mmol/kg. body weight.
  All became drowsy 1 hour after injection.
  All remained that way for 1 hour and then recovered and became very active.
  No fatalities.

It should be remarked that inasmuch as sedation and tranquilization go hand-in-hand with analgesia and soporification, my invention may be utilized at lower dosage levels where the former effects are the principal ones sought, as distinguished from full-scale analgesia and deep sleep.

As mentioned hereinabove, the imidazole ring undergoes salt formation with acids, and an explanation of the customary nomenclature may be useful. It is commonplace to call the salt formed with hydrochloric acid the "hydrochloride," but more properly, it is simply the chloride, and this is used in the claims which follow.

It will be understood that while I have described my invention with the aid of various specific examples, numerous variations are possible in the administrative route, excipients, and diluents, frequency of administration, dosage levels, and the like, all in accordance with the accepted pharmacological practice.

Having described my invention, I claim:

1. The process of inducing analgesia in a warm-blooded animal which comprises administering to said animal in need of said treatment a therapeutically effective dose of 4-imidazoleacetic acid or a pharmaceutically acceptable salt thereof.

2. The process in accordance with claim 1 wherein said imidazoleacetic acid is present in the form of sodium, potassium, lithium, chloride, sulfate or acetate salt.

3. The process in accordance with claim 1 wherein said administration is at a dosage level within the range of about 0.1 to about 10 millimoles of imidazoleacetic acid per kilogram weight of said animal.

4. The process in accordance with claim 1 wherein said administration is at a dosage level high enough to induce sleep, as well as analgesia.

5. The process in accordance with claim 1 wherein said imidazoleacetic acid is present in the form of lower alkyl ester thereof.

6. The process in accordance with claim 5 wherein said lower alkyl is ethyl.

7. The process in accordance with claim 5 wherein said lower alkyl is propyl.

References Cited

Chemical Abstracts 53: 3510(d) (1959).
Chemical Abstracts 66: 17891(b) (1967).

ALBERT T. MEYERS, Primary Examiner

J. D. GOLDBERG, Assistant Examiner